United States Patent [19]

Morikawa et al.

[11] 4,168,944
[45] Sep. 25, 1979

[54] APPARATUS FOR MANUFACTURING A TUBULAR HONEYCOMB ASSEMBLY WITH AN ADIABATIC LAYER FORMED INTEGRALLY ON THE PERIPHERAL WALL

[75] Inventors: Akira Morikawa; Yoshinori Narita, both of Nagoya, Japan

[73] Assignee: NGK Spark Plug Co., Ltd., Nagoya, Japan

[21] Appl. No.: 928,633

[22] Filed: Jul. 27, 1978

Related U.S. Application Data

[62] Division of Ser. No. 827,182, Aug. 23, 1977, abandoned.

[30] Foreign Application Priority Data

Aug. 24, 1976 [JP] Japan .................... 51/100827

[51] Int. Cl.² ............... B29F 3/04; B29D 23/04
[52] U.S. Cl. ................. 425/464; 425/382 R; 264/173; 264/209
[58] Field of Search ................ 425/192 R, 461, 462, 425/463, 464; 264/173, 177 R, 209, 56

[56] References Cited

U.S. PATENT DOCUMENTS

| | | | |
|---|---|---|---|
| 2,551,710 | 5/1951 | Slaughter | 264/209 X |
| 2,740,986 | 4/1956 | Lipscomb et al. | 425/641 X |
| 2,974,613 | 3/1961 | Maldari | 425/462 |
| 3,308,508 | 3/1967 | Schrenk | 425/462 X |
| 3,321,805 | 5/1967 | Given | 425/192 R |
| 3,520,963 | 7/1970 | Allseits et al. | 264/173 X |
| 3,790,654 | 2/1974 | Bagley | 264/56 X |
| 3,836,302 | 9/1974 | Kaukeinen | 425/461 X |
| 3,899,276 | 8/1975 | Sokolow | 425/461 X |
| 3,905,743 | 9/1975 | Bagley | 425/464 |
| 3,932,106 | 1/1976 | Vogts | 425/464 X |
| 3,983,283 | 9/1976 | Bagley | 425/461 X |
| 4,041,597 | 8/1977 | Folmar et al. | 425/464 X |

FOREIGN PATENT DOCUMENTS 1228399 11/1966 Fed. Rep. of Germany ........... 264/209

*Primary Examiner*—J. Howard Flint, Jr.
*Attorney, Agent, or Firm*—Sughrue, Rothwell, Mion, Zinn and Macpeak

[57] ABSTRACT

Apparatus for manufacturing a tubular honeycomb with adiabatic passages 107 formed integrally on its outer wall includes a first body 2 having a plurality of honeycomb shaped through holes 6, 7, 10 and a flange 3 secured to an extrusion pipe 1 carrying a plastic material under pressure, and a truncated conical portion 5 projecting coaxially from the flange. A second cylindrical body 12 has a truncated conical through hole disposed coaxially around the conical portion of the first body to define therebetween a first annular space 21 communicating with the honeycomb, and comprises truncated conical projection 15 alternately provided with slits 16 and holes 17 communicating with the first annular space. The first and second bodies are secured together by a stopper ring having a truncated conical through hole communicating with the slits and holes in the second body and disposed coaxially therearound to define therebetween a second annular space 22. The extruded tube thus has a honeycomb core 101 enclosed by a first pipe section 104, and ribs 105 extending radially outwardly from the first pipe section to a surrounding outer second pipe section 106.

8 Claims, 9 Drawing Figures ns of the first or second metal-pattern body toward the
other diametric end thereof, thereby successively bending the tubular honeycomb extrusion to a desired curvature.

APPARATUS FOR MANUFACTURING A TUBULAR HONEYCOMB ASSEMBLY WITH AN ADIABATIC LAYER FORMED INTEGRALLY ON THE PERIPHERAL WALL

This is a division of application Ser. No. 827,182, filed Aug. 23, 1977, now abandoned.

BACKGROUND OF THE INVENTION

1. Field of the Invention

The present invention relates to an apparatus for manufacturing a tubular honeycomb assembly with an adiabatic layer formed integrally on the peripheral wall.

2. Description of the Prior Art

The so-called tubular honeycomb assembly constructed by enclosing the outer periphery of a honeycomb assembly comprising a plurality of independent longitudinal spaces each seperated by a partition wall has been preferably used as a complete combustor for an incomplete combusting gas, e.g. as a pipe for joining with an exhaust gas combustor such as an automobile engine. However, such a tubular honeycomb assembly has the disadvantage that its adiabatic effect from the circumferential atmosphere is somewhat unsatisfactory.

SUMMARY OF THE INVENTION

It is therefore an object of the invention to provide a novel tubular honeycomb assembly with an adiabatic layer formed integrally on the peripheral wall of the conventional tubular honeycomb assembly, capable of enhancing an adiabatic effect from the circumferential atmosphere as well as expanding its applications by utilizing the adiabatic layer as a passageway for any fluid other than fluid transmitted through the tubular honeycomb section or by fulfilling any fluid such as gas or air within the adiabatic layer.

The object of the invention is attained by provision of a tubular honeycomb assembly with an adiabatic layer formed integrally on the peripheral wall, manufactured by extruding apparatus comprising a first metal-pattern body comprising a truncated conical portion in which a plurality of honeycomb shaped grooves are provided, and a flange portion which is provided integrally on one longitudinal end of the truncated conical portion, those portions of which facing the respective intersecting points of the plural honeycomb shaped grooves being provided with holes each having a larger diameter than that of each corresponding intersection point of the honeycomb shaped grooves, and which is secured to an extrusion guide pipe into which a plastic material to be shaped is successively introduced under a predetermined pressure. The plural honeycomb shaped grooves provided in the truncated conical portion of the first metal-pattern body and the holes provided in the flange portion thereof jointly act as an extrusion passage for shaping a tubular honeycomb section of the desired assembly. A second cylindrical metal-pattern body which has at its center a truncated conical through hole disposed coaxially above the truncated conical portion of the first metal-pattern body to define therebetween a first space communicating with parts of the honeycomb shaped grooves and acting as an extrusion passage for shaping a first pipe section enclosing the outer periphery of the tubular honeycomb section comprises a flange portion secured to the extrusion guide pipe together with the flange portion of the first metal-pattern body, and a truncated conical portion projecting coaxially from one surface of the flange portion opposite to the extrusion guide pipe and provided with a plurality of slits in the longitudinal direction at a predetermined interval and with a plurality of holes each interposed between the adjacent ones of the plural slits, the respective lower ends of the plural slits and holes being communicated with the first space; and a stopper ring securing the first and second metal-pattern bodies through their flange portions to the extrusion guide pipe and having a truncated conical shaped through hole disposed coaxially around the truncated conical portion of the second metal-pattern body to define therebetween a second space communicating with the holes in the conical portion of the second metal-pattern body and acting as an extrusion passage for shaping a second pipe section disposed coaxially above the first pipe section. The plural slits provided in the conical portion of the second metal-pattern body have their upper ends communicated with the second space and act as an extrusion passage for shaping a plurality of radially extended ribs interposed between the first and second pipe sections.

Said extruding apparatus further includes means for gradually differing resistances or speeds of the plastic material to be shaped passing through the respective extruding passageways for shaping the tubular honeycomb, first and second pipe sections from one diametric end of the first or second metal-pattern body toward the other diametric end thereof, thereby successively bending the tubular honeycomb extrusion to a desired curvature.

The tubular honeycomb assembly with an adiabatic layer formed integrally on its peripheral wall, manufactured by the aforesaid extruding apparatus has the advantage that it can attain more excellent adiabatic effect than in the prior art tubular honeycomb assembly as well as expand its applications by utilizing the adiabatic layer as a passageway for any fluid other than fluid transmitted through the tubular honeycomb section or by fulfilling any fluid within the adiabatic layer.

Further, the aforesaid extruding apparatus has the advantage capable of shaping any desired straight or bent tubular honeycomb assembly with an adiabatic layer formed integrally on its peripheral wall utilizing a flexible plastic material such as any plastics as well as any inflexible heat-resisting plastic material such as cordierite porcelain, alumina or the like particularly suitable for a pipe to join with an exhaust gas combustor such as an automobile engine.

PREFERRED EMBODIMENTS OF THE INVENTION

Figure 1:
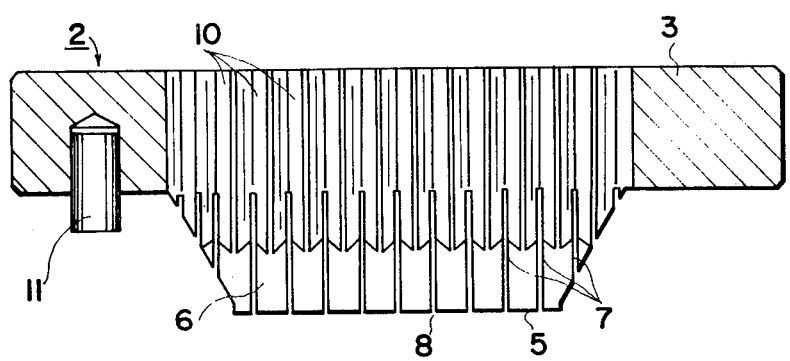
FIG. 1 shows a cross-sectional side view of a first metal-pattern body according to one embodiment of the invention.
Figure 2:
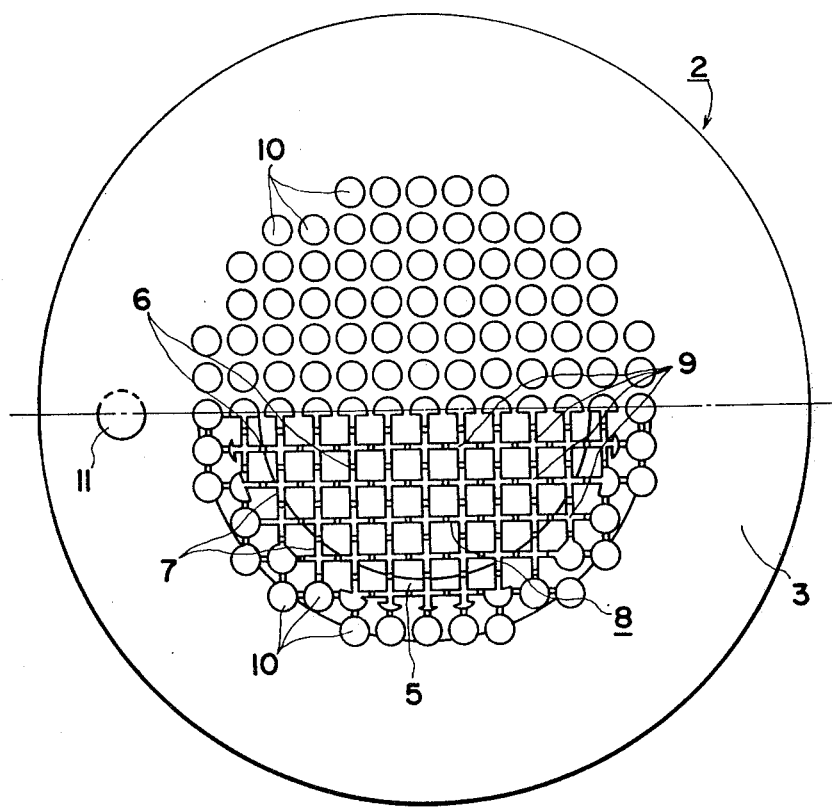
FIG. 2 shows a front half and a rear half view of FIG. 1.

Referring to FIGS. 1 and 2, reference numeral 2 designates a first metal-pattern body prepared in accordance with one embodiment of the invention. The metal-pattern body 2 comprises a flange portion 3 which has substantially the same diameter as that of an extrusion guide pipe 1 (FIG. 5) joined with an extruding machine (not shown) and which is joined to the outlet end of the extrusion guide pipe 1, and a truncated conical portion 5 projected coaxially from one surface of the flange portion 3 opposite to the extrusion guide pipe 1 so as to have a gradually reduced diameter. The trancated conical portion 5 is provided with honeycomb shaped grooves 8 comprising a plurality of longitudinal grooves 6 each formed at a predetermined interval and a plurality of transverse grooves 7 each formed at a predetermined interval. Those portions of the flange portion 3 which face the respective intersection points 9 of the longitudinal and transverse grooves 6 and 7 are bored with elongated circular holes 10 which each have a larger diameter than that of each corresponding intersection point of the honeycomb shaped grooves 8 and the front end portions of which overlap above the rear end portions of the corresponding honeycomb shaped grooves 8.

Figure 3:
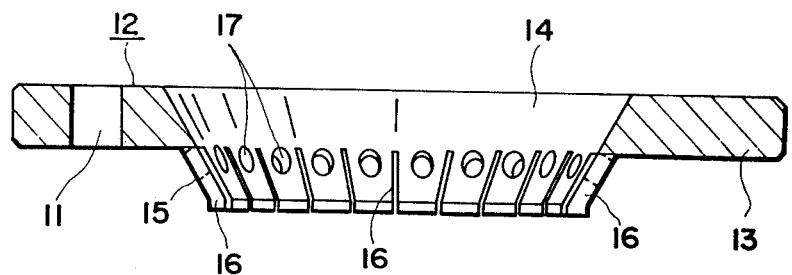
FIG. 3 shows a cross-sectional side view of a second metal-pattern body in accordance with the invention.
Figure 4:
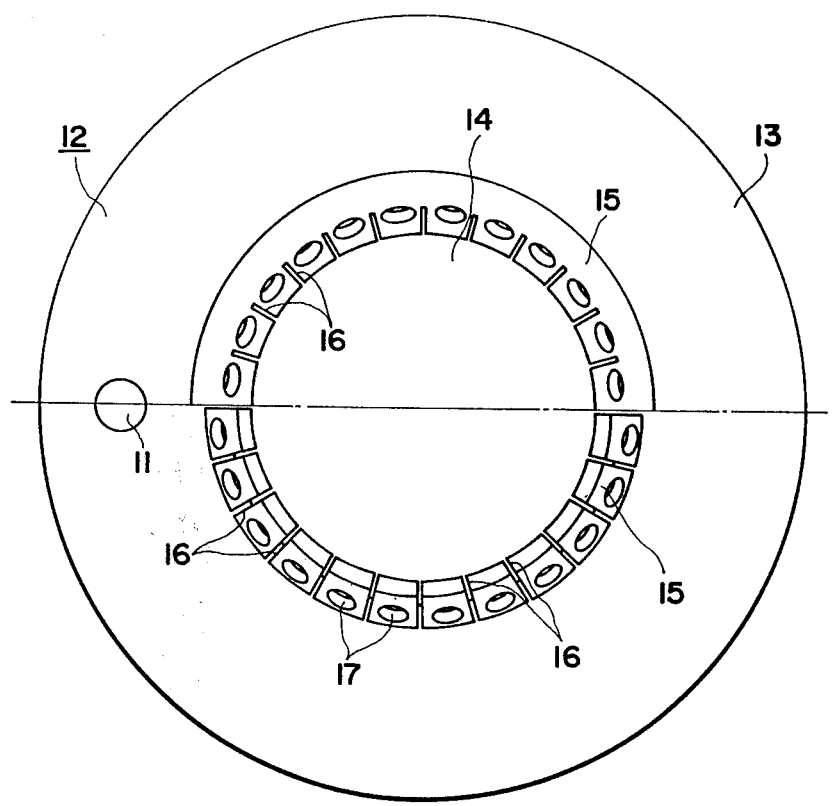
FIG. 4 shows a front half and a rear half view of FIG. 3.
Figure 6:
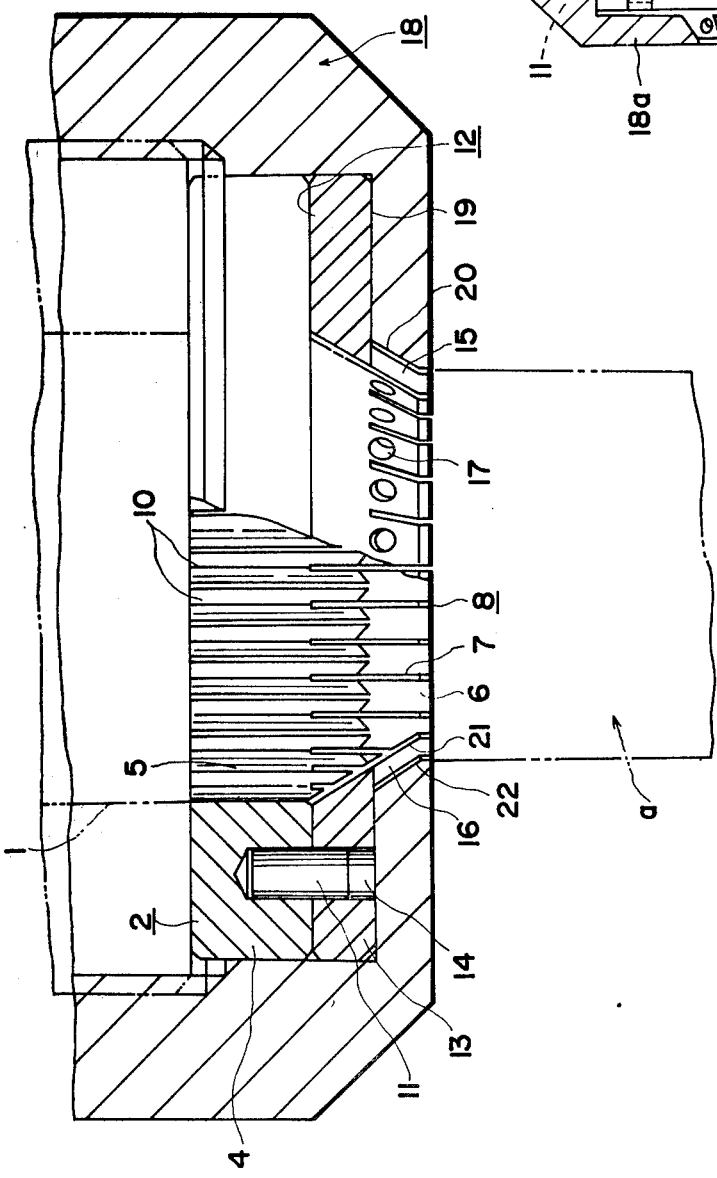
FIG. 6 shows a schematic enlarged cross-sectional side view, partly broken away, of FIG. 5.

On the one hand, a second cylindrical metal-pattern body 12 as best shown in FIGS. 3, 4 and 6 is prepared which has its longitudinal length substantially equal to that of the truncated conical portion 5 of the first metal-pattern body 2 and is provided at its center with a truncated conical shaped through hole 14 having an appropriately larger diameter than that of the truncated conical portion 5. The second metal-pattern body 12 comprises a cylindrical flange portion 13 having substantially the same diameter as, and joined through a positioning pin 11 to, the flange portion 3 of the first metal-pattern body 2, and a cylindrical truncated conical portion 15 projecting coaxially from one surface of the flange portion 13 opposite to the extrusion guide pipe 1. The flange portion 13 of the second metal-pattern body 12 is provided with a plurality of rectangular slits 16 in the radial direction at predetermined intervals and with a plurality of holes 17 each interposed between adjacent ones of the slits 16.

Figure 5:
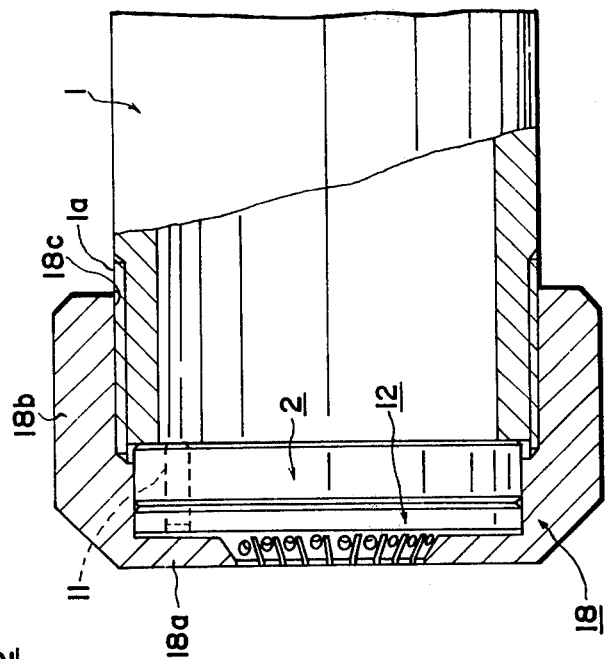
FIG. 5 shows a schematic side view, partly broken away and cross-sectioned, of an extruding apparatus according to one embodiment of the invention.

On the other hand, a stopper ring 18 as best shown in FIG. 5 is prepared which comprises a small ring section 18a having at its center a truncated conical shaped through hole 20 arranged coaxially above the truncated conical portion 15 of the second metal-pattern body 12 and having an appropriately larger diameter than, and the same longitudinal length as, the truncated conical portion 15; and a large ring section 18b projected integrally from the outer peripheral end of the small ring section 18a and having substantially the same inner diameter as the flange portions 3 and 15 of the first and second metal-pattern bodies 2 and 12, a female thread 18c being formed in the inner wall of the large ring section 18b and a male thread 1a being formed on the outer wall of the outlet end of the extrusion guide pipe 1. Thus, under the condition where the flange portion 3 of the first metal-pattern body 2 is contacted with the outlet end surface of the extrusion guide pipe 1 and where the flange portion 15 of the second metal-pattern body 12 is joined through the positioning pin 11 to the flange portion 3 of the first metal-pattern body 2 so that the truncated conical shaped through hole 20 of the second metal-pattern body 12 is positively arranged coaxially above the truncated conical portion 5 of the first metal-pattern body 2, the stopper ring 18 is screwed to the extrusion guide pipe 1 so as to press the first and second metal-pattern bodies 2 and 12 toward the extrusion guide pipe 1 in such a manner that the small ring section 18a of the stopper ring 18 is positively arranged coaxially above the conical portion 15 of the second metal-pattern body 12. Under this condition, an annular extrusion passageway 21 for shaping a first pipe section 104 (FIG. 7) of the desired tubular honeycomb assembly a is formed between the peripheral wall of the truncated conical portion 3 of the first metal-pattern body 2 and the inner wall surface defining the central truncated conical shaped through hole 14 of the second metal-pattern body 12, and another annular extrusion passageway 22 for shaping a second pipe section 106 of the honeycomb assembly a is formed between the peripheral wall of the truncated conical portion 15 of the second metal-pattern body 12 and the innner wall surface defining the central through hole 20 of the stopper ring 18. The annular passageway 21 thus communicates with parts of the honeycomb shaped grooves 8 of the first metal-pattern body 2, and the annular passageway 22 communicates through the plural slits 16 and holes 17 provided in the second metal-pattern body 12 with the annular passageway 21.

Thus, when a predetermined plastic material to be shaped is successively introduced into the extrusion guide pipe 1, then a tubular honeycomb section 103 (FIG. 7) enclosing a plurality of individual spaces 101 by respective peripheral walls 102 is shaped through the elongated circular holes 10 and the honeycomb shaped grooves 8 provided respectively in the first metal-pattern body 2, the first pipe section 104 is shaped through the annular passageway 21 so as to surround the outer periphery of the honeycomb section 103, and the second pipe section 106 is shaped through the plural holes 17 provided in the second metal-pattern body 12 and through the annular passageway 22 so as to surround the respective outer peripheries of a plurality of radial ribs 105 shaped through the plural slits 16 provided in the second metal-pattern body 12, a plurality of individual adiabatic spaces 107 being formed between the respective adjacent radial ribs 105.

Figure 8:
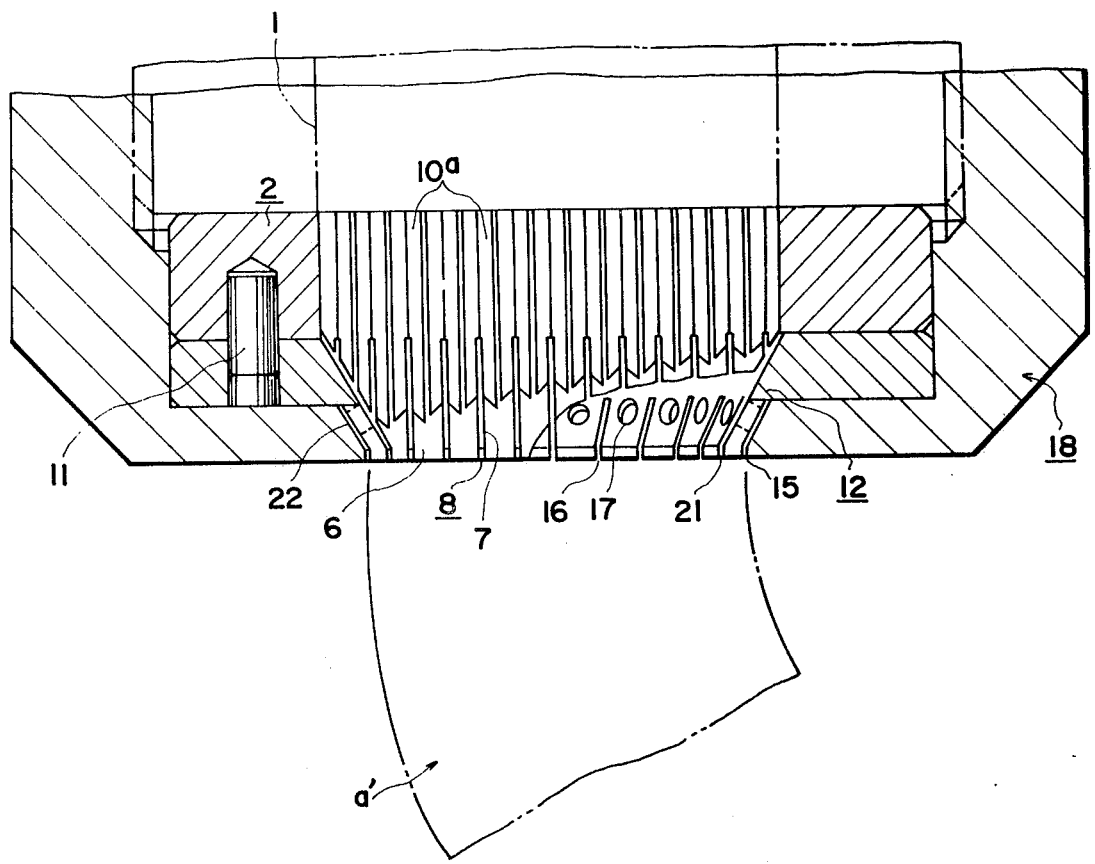
FIG. 8 shows a schematic enlarged cross-sectional side view, partly broken away, of an extruding apparatus in accordance with another embodiment of the invention.
Figure 9:
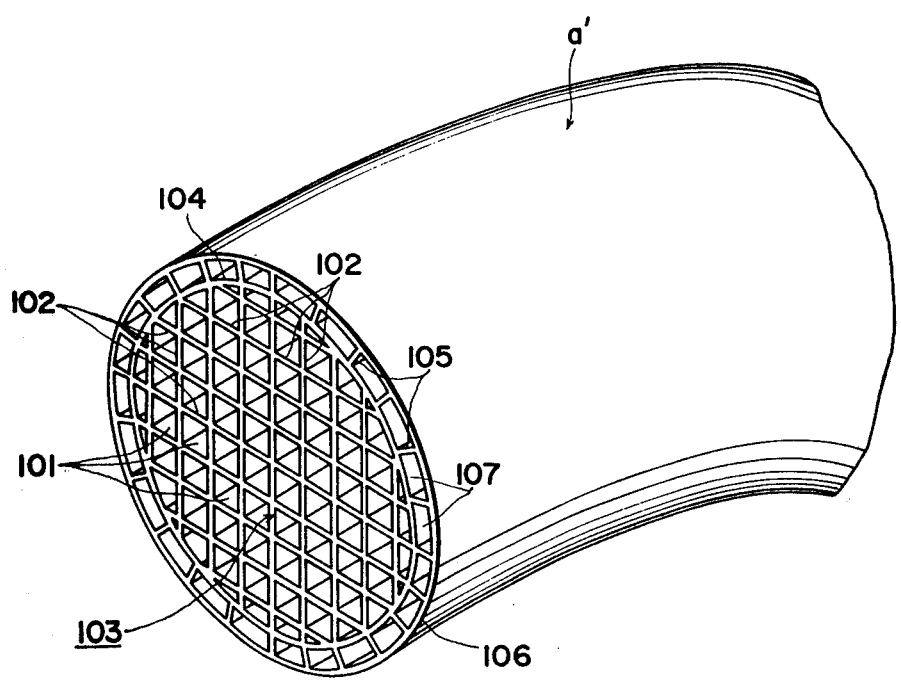
FIG. 9 shows a perspective view of a tubular honeycomb assembly with an adiabatic layer formed integrally on its peripheral wall manufactured in accordance with the extruding apparatus of FIG. 9.

The embodiment according to FIG. 8 has substantially the same construction as the above-mentioned embodiment, excepting that the elongated circular holes 10a provided in the first metal-pattern body 2 are formed to have their lengths reduced gradually from one diametric end of the metal pattern body 2 toward the other diametric end thereby enabling to shape a bent tubular honeycomb assembly a' as shown in FIG. 9 having a predetermined curvature. Therefore, parts of FIGS. 8 and 9 corresponding to those of FIGS. 1 to 7 are denoted by the same symbols and the description thereof is omitted.

Figure 7:
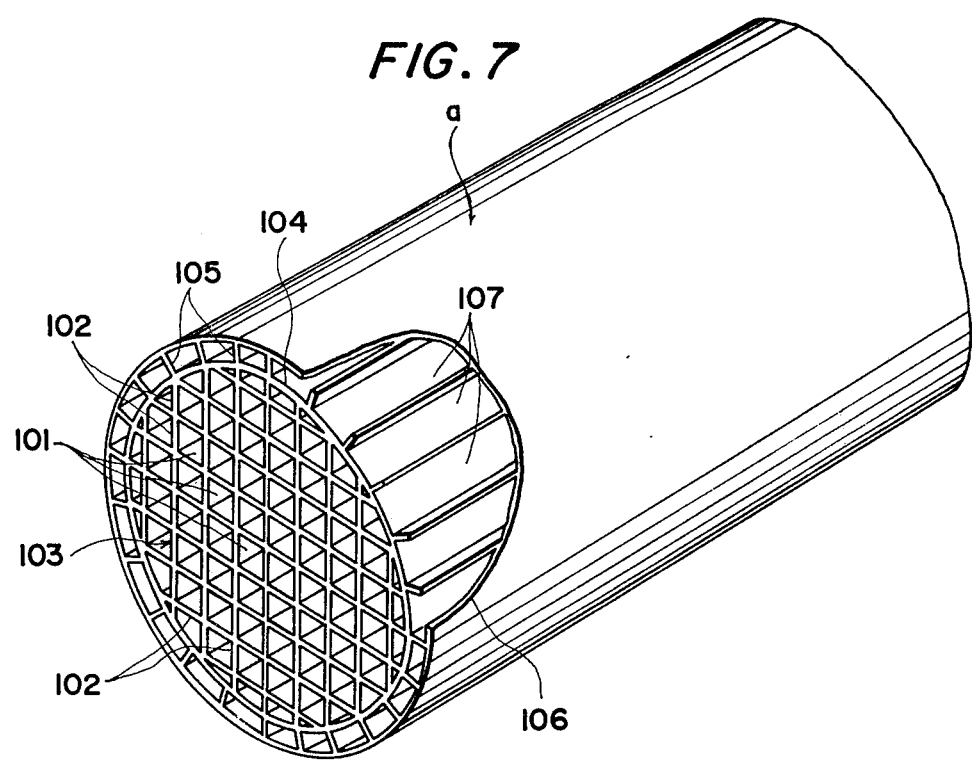
FIG. 7 shows a perspective view, partly broken away, of a tubular honeycomb assembly with an adiabatic layer formed integrally on its peripheral wall manufactured in accordance with one embodiment of the invention.

Thus, it will be understood to those skilled in the art that any desired straight or bent tubular honeycomb assembly a or a' as shown in FIG. 7 or 9 can be easily shaped according to the present invention. In this case, it is desired that the extruding ends of the first and second metal-pattern bodies 2 and 18 and the stopper ring 12 each have a straight extended portion having a predetermined length as best shown in FIGS. 6 and 8.

The straight or bent tubular honeycomb assembly a or a' manufactured in accordance with the invention is particularly suitable for a pipe to join with any exhaust gas combustor including an automobile engine. In such case, a cordierite porcelian, alumina or the like is preferably usable as a plastic material to be shaped, and the central tubular honeycomb section 103 is used for the passage of exhaust gas and the adiabatic spaces 107 defined by the first and second pipe sections 104 and 106 and the plural ribs 105 are used for the adiabatic purpose from the circumferential atmosphere. At this time, the respective peripheral walls 102 enclosing the individual spaces 101 of the central tubular honeycomb section 103 each function as a kind of an activation layer to burn exhaust gas passed therethrough away more perfectly.

It will be also understood to those skilled in the art the present invention is not limited by only the embodiments described herein, but applicable to any variations and modifications common in the technical scope to the invention.

What we claim is:

1. An apparatus for extruding a tubular honeycomb assembly with an adiabatic layer formed integrally on the peripheral wall comprising:

a first metal-pattern body comprising a trancated conical portion in which a plurality of honeycomb shaped grooves are provided, and a flange portion which is provided integrally on one longitudinal end of the trancated conical portion, those portions of which face the respective intersecting points of the plural honeycomb shaped grooves are provided with holes each having a larger diameter than that of each corresponding intersecting point of the honeycomb shaped grooves, and which is secured to an extrusion guide pipe into which a plastic material to be shaped is successively introduced under a predetermined pressure, the plural honeycomb shaped grooves provided in the trancated conical portion of the first metal-pattern body and the holes provided in the flange portion thereof jointly acting as an extruding passageway for shaping a tubular honeycomb section of the desired tubular honeycomb assembly;

a second cylindrical metal-pattern body which has at its center a trancated conical through hole disposed coaxially above the trancated conical portion of the first metal-pattern body to define therewithin a first space communicating with parts of the honeycomb shaped grooves and acting as an extruding passageway for shaping a first pipe section enclosing the outer periphery of the tubular honeycomb section, and which comprises a flange portion secured to the extrusion guide pipe together with the flange portion of the first metal-pattern body, and a trancated conical portion projected coaxially from one surface of the flange portion opposite to the extrusion guide pipe and provided with a plurality of slits in the longitudinal direction at a predetermined interval and with a plurality of slots each interposed between the adjacent ones of the plural slits, the respective lower ends of the plural slits and slots being communicated with the first space; and a stopper ring securing the first and second metal-pattern bodies through their flange portions to the extrusion guide pipe and having a trancated conical shaped through hole disposed coaxially above the trancated conical portion of the second metal-pattern body to define therewithin a second space communicating with the upper ends of the plural slots provided in the trancated conical portion of the second metal-pattern body and acting as an extruding passageway for shaping a second pipe section disposed coaxially above the first pipe section, the plural slits provided in the trancated conical portion of the second metal-pattern body having their upper ends communicated with the second space and acting as an extruding passageway for shaping a plurality of radially extended ribs interposed between the first and second pipe sections.

2. The apparatus as claimed in claim 1, wherein the plural honeycomb shaped grooves provided in the trancated conical portion of the first metal-pattern body comprise a plurality of transversal and longitudinal grooves each formed therein at a predetermined interval.

3. The apparatus as claimed in claim 1, wherein the trancated conical portions of the first and second metal-pattern bodies and the trancated conical shaped through hole of the stopper ring are each formed to have its trancated end at the extruding front end side.

4. The apparatus as claimed in claim 1, wherein the stopper ring is secured to the extrusion guide pipe by screwing under the condition of pressing the first and second metal-pattern bodies toward the extrusion guide pipe.

5. The apparatus as claimed in claim 4, wherein the second metal-pattern body is joined with the first metal-pattern body by a positioning pin interposed between their mutually facing flange portions.

6. The apparatus as claimed in claim 1, wherein the extruding ends of the trancated conical portions of the first and second metal-pattern bodies and of the stopper ring are each straightly extended by a predetermined length.

7. The apparatus as claimed in claim 1, further comprising means for gradually differing resistances or speeds of the plastic material to be shaped passing through the respective extruding passageways for shaping the tubular honeycomb, first and second pipe sections from one diametric end of the first or second metal-pattern body toward the other diametric end thereof, thereby successively to bend the tubular honeycomb, first and second pipe sections at a desired curvature.

8. The apparatus as claimed in claim 7, wherein said means for gradually differing comprises gradually reducing the longitudinal lengths of the holes provided in the flange portion of the first metal-pattern body from its one diametric end toward the other diametric end.

* * * * *